United States Patent
Gottumukkala et al.

(10) Patent No.: US 10,337,283 B2
(45) Date of Patent: Jul. 2, 2019

(54) OPTIMUM FLOW CONTROL VALVE SETTING SYSTEM AND PROCEDURE

(71) Applicant: Schlumberger Technology Corporation, Sugar Land, TX (US)

(72) Inventors: Varma Gottumukkala, Missouri City, TX (US); Vadim Blekhman, Bellaire, TX (US); Raj Banerjee, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 91 days.

(21) Appl. No.: 14/780,955

(22) PCT Filed: Mar. 24, 2014

(86) PCT No.: PCT/US2014/031539
§ 371 (c)(1),
(2) Date: Sep. 28, 2015

(87) PCT Pub. No.: WO2014/160626
PCT Pub. Date: Oct. 2, 2014

(65) Prior Publication Data
US 2016/0061003 A1    Mar. 3, 2016

Related U.S. Application Data
(60) Provisional application No. 61/806,813, filed on Mar. 29, 2013.

(51) Int. Cl.
*E21B 43/14* (2006.01)
*E21B 34/06* (2006.01)
(Continued)

(52) U.S. Cl.
CPC ............. *E21B 34/06* (2013.01); *E21B 34/16* (2013.01); *E21B 43/14* (2013.01); *E21B 47/06* (2013.01); *E21B 47/10* (2013.01); *G05B 13/041* (2013.01)

(58) Field of Classification Search
USPC ........... 166/373, 50, 66.6, 250.15, 245, 313
See application file for complete search history.

(56) References Cited

U.S. PATENT DOCUMENTS 5,706,896 A * 1/1998 Tubel .................... E21B 34/066
166/313
5,887,657 A    3/1999 Bussear et al.
(Continued)

FOREIGN PATENT DOCUMENTS

GB    2448018 A    10/2008
JP    4084042 A    4/2008
(Continued)

OTHER PUBLICATIONS

International Search Report and Written Opinion for corresponding PCT Application Serial No. PCT/US2014/031539 dated Jun. 27, 2014, 10 pages.
(Continued)

*Primary Examiner* — Sean D Andrish

(57) ABSTRACT

A technique facilitates selection of optimum flow control valve settings to improve a desired objective function in a multizone well having zonal isolation. A network of flow control valves is provided in a completion network disposed along isolated well zones of at least one lateral bore of the multizone well. Data is acquired from downhole in the multizone well and processed on processor system modules which may be used in selected combinations. Examples of such modules comprise completion network modules, deconvolution modules, optimization modules, and/or inflow-outflow modules. The modules are designed to pro-
(Continued)

cess the collected data in a manner which facilitates adjustment of the flow control valve settings in the network of flow control valves to improve the desired objective function.

18 Claims, 5 Drawing Sheets

(51) Int. Cl.
*E21B 34/16* (2006.01)
*E21B 47/06* (2012.01)
*E21B 47/10* (2012.01)
*G05B 13/04* (2006.01)

(56) References Cited

U.S. PATENT DOCUMENTS

| | | | |
|---|---|---|---|
| 6,516,888 | B1 | 2/2003 | Gunnarson et al. |
| 9,323,252 | B2 | 4/2016 | Slupphaug et al. |
| 9,864,353 | B2 | 1/2018 | Tonkin et al. |
| 2006/0241867 | A1* | 10/2006 | Kuchuk ............... E21B 49/00 702/13 |
| 2007/0168056 | A1 | 7/2007 | Shayegi et al. |
| 2008/0236839 | A1 | 10/2008 | Oddie |
| 2008/0262737 | A1* | 10/2008 | Thigpen ............... E21B 43/00 702/9 |
| 2010/0217575 | A1* | 8/2010 | Briers ............... E21B 43/12 703/10 |
| 2011/0040536 | A1* | 2/2011 | Levitan ............... E21B 49/00 703/2 |
| 2011/0098781 | A1 | 3/2011 | Burdette et al. |
| 2012/0095603 | A1 | 4/2012 | Rashid et al. |
| 2013/0048303 | A1 | 2/2013 | Patel et al. |
| 2014/0156238 | A1 | 6/2014 | Rashid et al. |
| 2014/0358511 | A1 | 12/2014 | Waage et al. |
| 2015/0015412 | A1 | 1/2015 | Abbassian et al. |
| 2015/0053483 | A1 | 2/2015 | Mebane, III |
| 2015/0315903 | A1 | 11/2015 | Abbassian et al. |
| 2016/0053605 | A1 | 2/2016 | Abbassian et al. |
| 2016/0054713 | A1 | 2/2016 | Foss et al. |

FOREIGN PATENT DOCUMENTS

| | | |
|---|---|---|
| RU | 2383718 C2 | 3/2010 |
| RU | 2456437 C2 | 7/2012 |
| WO | 0111189 A2 | 2/2001 |
| WO | 2006120537 A2 | 11/2006 |
| WO | WO2012115997 A2 | 8/2012 |
| WO | WO2014160626 A1 | 10/2014 |

OTHER PUBLICATIONS

Russian Official Action for corresponding Russian Application No. 2015146201 dated Nov. 9, 2016, with English translation, 12 pages.
Russian Decision on Grant for corresponding Russian Application No. 2015146201 dated Mar. 28, 2017, with English translation, 16 pages.
www.EPmag.com, "Offshore Logistics" Jan. 2009, 41 pp.
Dyer, S., et al., "Intelligent Completions—A Hands-Off Management Style", Mar. 31-Apr. 3, 2007, 14 pages.
Montaron, B., et al., "Intelligent Completions", 2007, 9 pages.
International Search Report and Written Opinion for related PCT Application Serial No. PCT/US2016/037309, dated Oct. 18, 2016, 16 pages.

* cited by examiner

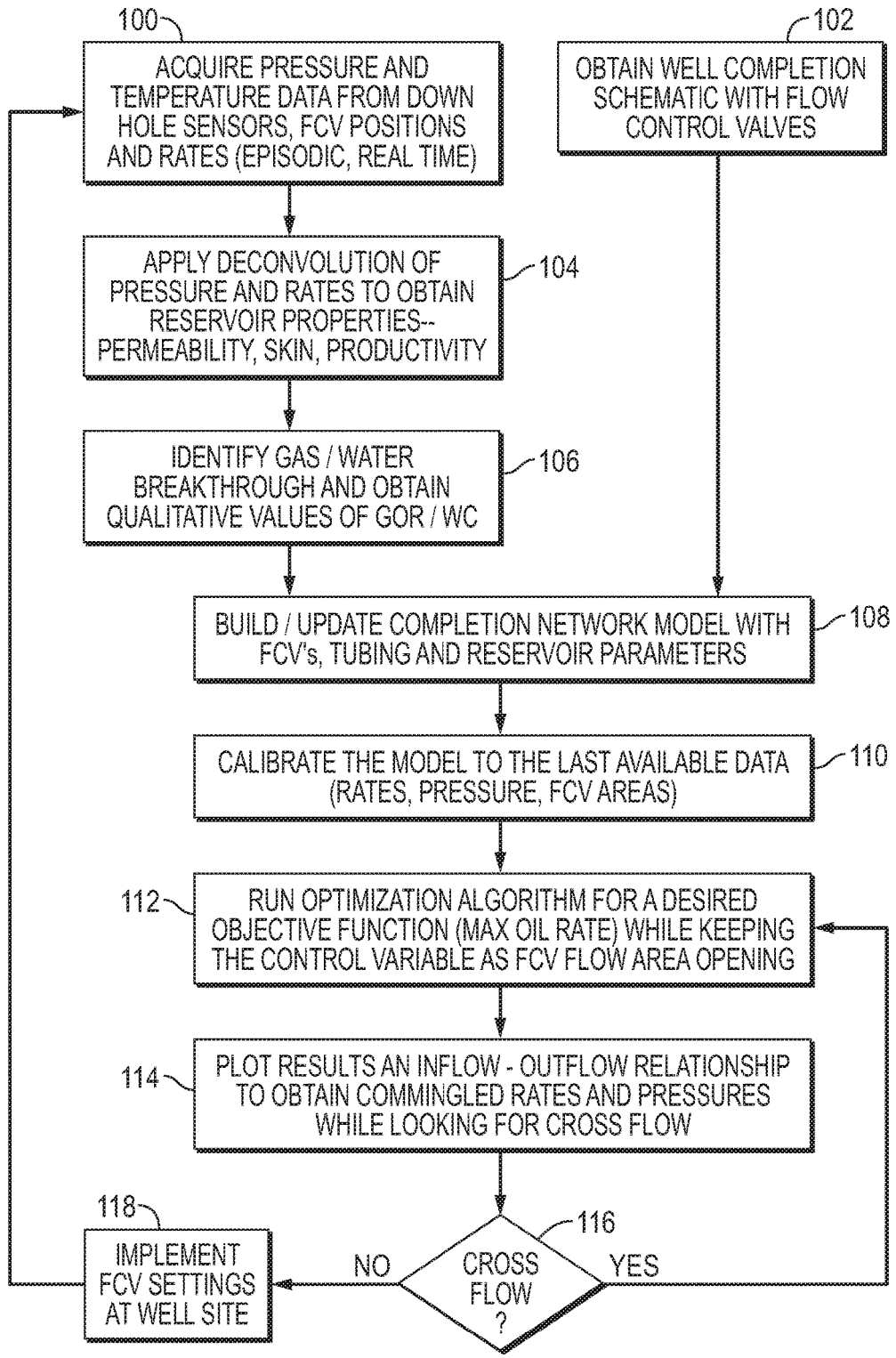

OPTIMUM FLOW CONTROL VALVE SETTING SYSTEM AND PROCEDURE

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed to control and enhance the efficiency of producing various fluids from the reservoir. One piece of equipment which may be installed is a flow control valve.

SUMMARY

In general, a flow control valve setting system and procedure are provided for use in a multizone well, e.g. a multilateral well, with zonal isolation provided by, for example, packers. A network of flow control valves is provided in a completion network disposed along isolated well zones of the lateral bore or bores of the multizone well. Data is acquired from individual downhole sensors (e.g. sensors for pressure, temperature, flow rates, positions, water/gas detection, and/or other parameters) corresponding with the flow control valves in the multizone well. The data may be processed on processor system modules/workflows which are used in selected combinations. Examples of such modules comprise completion network modules, deconvolution modules, optimization modules, and/or inflow-outflow modules. The modules are designed to process the collected data in a manner which facilitates adjustment of the optimum flow control valve settings in the network of flow control valves. The flow control valve settings are adjusted to improve a desired objective function, e.g. maximization of oil and/or minimization of water and gas production, of the multizone well while applying constraints at the multilateral/multizone level, e.g. constraints regarding draw down, bubble point, flow balance, and flow rate restriction.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 8 is a flowchart representing an example of a flow control valve setting procedure in a multizone well with zonal isolation, according to an embodiment of the disclosure.

DETAILED DESCRIPTION

Figure 1B:
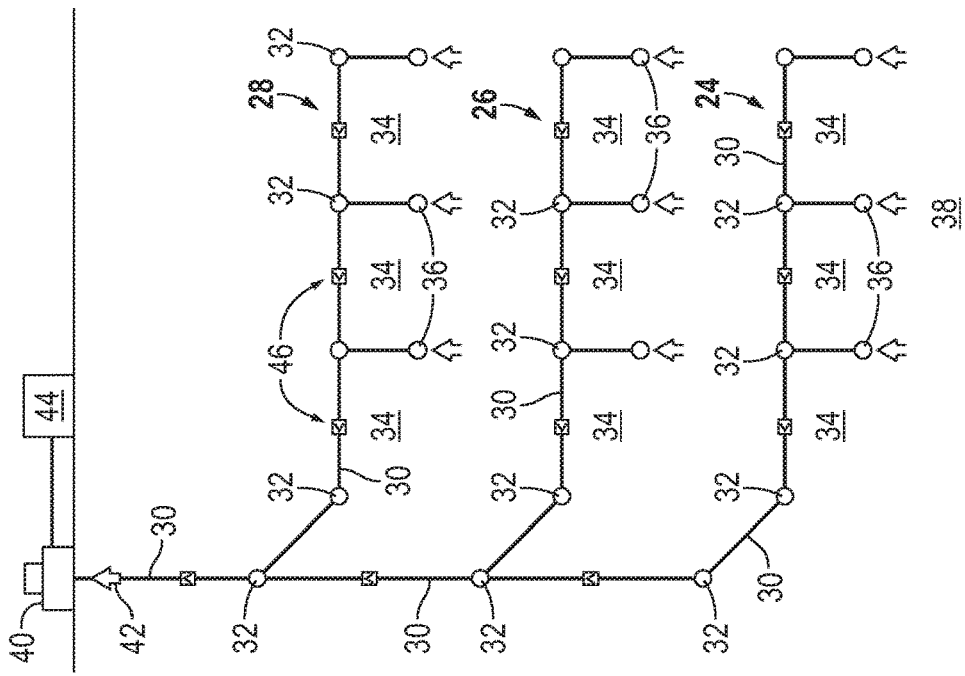
FIGS. 1A and 1B are schematic illustrations of an example of a multizone well, e.g. a multilateral well, with completion and a completion network model, respectively, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a methodology and system for setting flow control valves to improve performance. For example, the methodology and system may be used in a multizone well with zonal isolation to optimize a desired objective function, such as improving the flow of oil from the multizone well. A network of flow control valves is provided in a completion network disposed along isolated well zones of a lateral bore or lateral bores of the multizone well. Data is acquired from downhole sensors and processed on processor system modules. Examples of such modules comprise completion network modules, deconvolution modules, optimization modules, and/or inflow-outflow modules which may be used collectively or in various combinations. The modules may be software modules designed to process the collected data in a manner which facilitates adjustment of the flow control valve settings in the network of flow control valves to improve the desired objective function. The modules may be designed to process the collected data in a manner which facilitates adjustment of the optimum flow control valve settings in the network of flow control valves. By way of example, the flow control valve settings are adjusted to improve a desired objective function, e.g. maximization of oil and/or minimization of water and gas production, of the multizone well while applying constraints at the multilateral/multizone level, e.g. constraints regarding draw down, bubble point, flow balance, and flow rate restriction.

By way of example, the system and methodology may be used for setting the flow areas of flow control valves to achieve optimal zonal allocation of the production rate on the basis of downhole sensor data. The system and methodology enable improved feedback and optimization of the desired objective function as compared to previous model-less data driven techniques which relied on trending of gauge data to provide a short response time feedback to the flow control valves as part of a production monitoring setup. Embodiments of the present disclosure include the use of analytical well modeling tools and integrated workflows which can be used "on-the-fly" and in real time to manipulate and optimize flow control valve settings.

In an embodiment of a methodology for optimizing flow control valve settings, the methodology comprises deconvolution of the pressure transient response to continuous zonal flow rate changes instigated by flow control valve actuation. The methodology also may comprise inflow-outflow performance interpretation and an advisory technique using nodal analysis of the wellbore and well completion that is calibrated by the deconvolution results. Additionally, the methodology may comprise an optimization technique which sets flow control valve positions within specified constraints to optimize, e.g. maximize, a given objective function. The methodology may further be used to identify gas and/or water breakthrough by applying sensor data, e.g. pressure-volume-temperature (PVT) data, to flow control valve choke curves.

Deconvolution is a methodology used for reservoir evaluation through pressure transient testing, and inflow-outflow performance optimization has been employed for single zone completions. However the present application provides a simple graphical interface depicting interdependence of zonal flow rates and flowing pressures when flow through more than one flow control valve or more than one well zone is commingled into the same wellbore flow path. The optimization technique may utilize a suitable optimization algorithm, such as the optimization algorithm found in the MINLP optimizer software available from Schlumberger Corporation. The optimization algorithm is used in combination with nodal analysis software, such as the Pipesim software available from Schlumberger Corporation or other suitable programs, e.g Eclipse—a numerical simulation model also available from Schlumberger Corporation. Additionally, the current methodology facilitates identification of gas and/or water breakthrough by utilizing choke curves generated (Delta P versus Q) using a mechanistic choke model for a certain fluid PVT and varying gas-oil-ratios (GOR)/water cuts. The (Delta P versus Q) data obtained from the flow control valves in real-time may be overlaid on a set of type curves to identify gas and/or water breakthrough quantitatively.

In some embodiments, the flow control valve settings are controlled via a methodology derived from a model-based architecture and workflows. This approach utilizes wellbore, reservoir, and fluid parameters including, for example, depths, completion tubing inside diameters, completion equipment installed, reservoir properties, pressure-volume-temperature data, and/or other parameters.

Figure 1A:
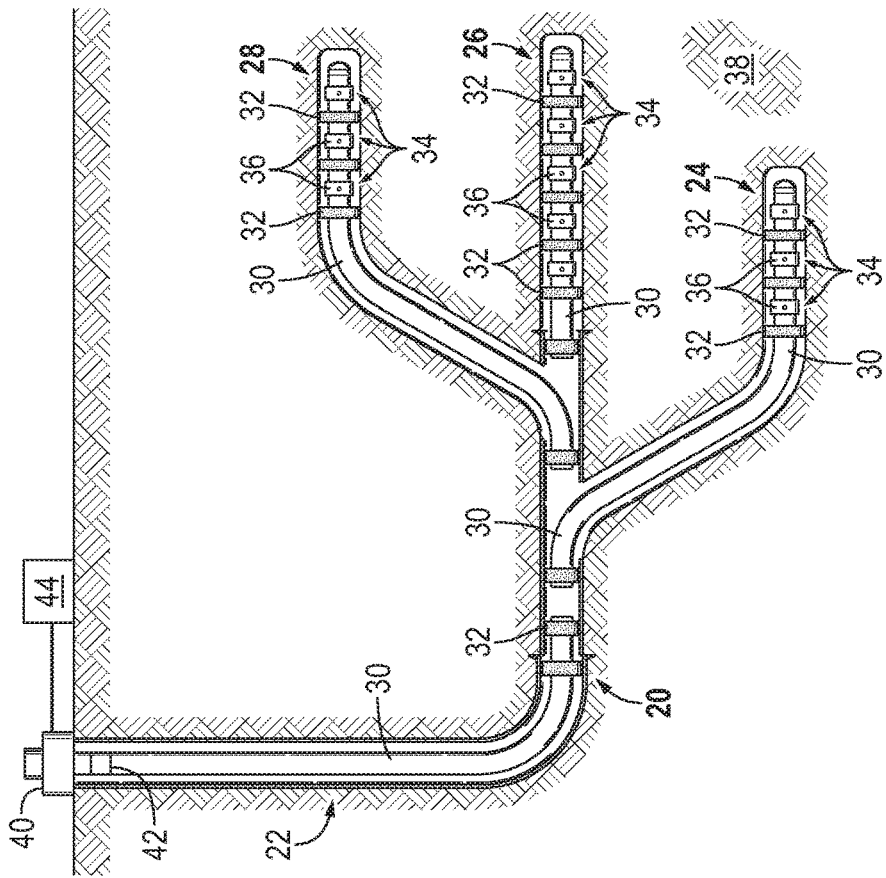

Referring generally to FIGS. 1A and 1B, a simple network model representing a well completion 20, e.g. a multilateral well completion, disposed in a multizone well 22, e.g. a multilateral well having multiple isolated zones, may be constructed using suitable commercial software that can handle fluid flow calculations, e.g. Pipesim, Eclipse, or Petrel available from Schlumberger Corporation. In FIG. 1A, the figure illustrates an example of an actual multilateral well completion 20 and multizone/multilateral well 22 while FIG. 1B illustrates the corresponding network model. It should be noted that the multizone well 22 may comprise a single lateral bore with multiple well zones or a plurality of lateral bores with multiple well zones. Similar elements from the illustrated actual multilateral well completion and from the network model of the completion have been labeled with similar reference numerals.

In the example illustrated in FIGS. 1A and 1B, the multizone well 22 comprises a multilateral well having lateral bores 24, 26 and 28. However, the well may have other numbers and arrangements of lateral bores, and the illustrated embodiment is provided as an example to facilitate explanation of the flow control valve setting methodology. The well completion 20 comprises sections of tubing 30 which extend between and/or through various completion components, including packers 32 which isolate corresponding well zones 34. Additionally, the well completion 20 comprises a plurality of flow control valves 36 which control fluid flows and fluid flow rates from the various corresponding well zones 34 into multilateral well completion 20.

For example, well fluid may flow from a surrounding formation 38, e.g. a hydrocarbon fluids bearing formation, and into well completion 20 through flow control valves 36 at corresponding well zones 34. The fluid is commingled after flowing through the flow control valves 36 and the commingled fluid flow is directed up through tubing sections 30 to a wellhead 40 for collection. The wellhead 40 or other surface equipment also may comprise flow control equipment 42, e.g. a valve or other type of choking device, to control flow rates and pressures. As described in greater detail below, a control system 44 also may work in cooperation with a sensor system 46 to obtain and process data in a manner which facilitates improved setting of the flow control valves 36 so as to optimize, e.g. maximize, a desired objective function of the overall well completion 20.

The network model illustrated in FIG. 1B is constructed to represent the various components of multilateral well completion 20 including, for example, the inside and outside diameters of tubing sections 30, casing perforations in a cased well, depths of components, e.g. depths of flow control valves, number and position of lateral bores, well zones, reservoir properties, fluid parameters, and types of completion equipment, e.g. types of flow control valves. The network model, e.g. a nodal analysis software module such as Pipesim or a numerical model such as Eclipse or Petrel, may use existing data related to static wellbore parameters (e.g. inside diameters, outside diameters, and depths) diameters which normally do not change during the life of the well. Additionally, the model may utilize transient data which is regularly updated. The data may be updated episodically or in real time. Examples of the updated transient data include changes in pressures, fluid compositions (e.g. increasing GOR, water cut, and/or other fluid compositional changes) and changes in flow control valve positions, i.e. settings, that are monitored via downhole sensors of sensor system 46. The downhole sensors may include sensors which are part of the flow control valves and sensors, e.g. pressure and temperature sensors, which are located separately in the various well zones and/or other well locations.

The network model utilizes workflows which perform data analysis and integrate accurate inputs of reservoir properties, pressures, fluid data, and/or other data to the model. The network model is then updated/calibrated for running optimization scenarios and for validating results for implementation of those optimization scenarios. Once flow control valve settings are implemented based on the validated optimization scenarios, the network model may be continually recalibrated which effectively continues the optimization loop.

Figure 2:
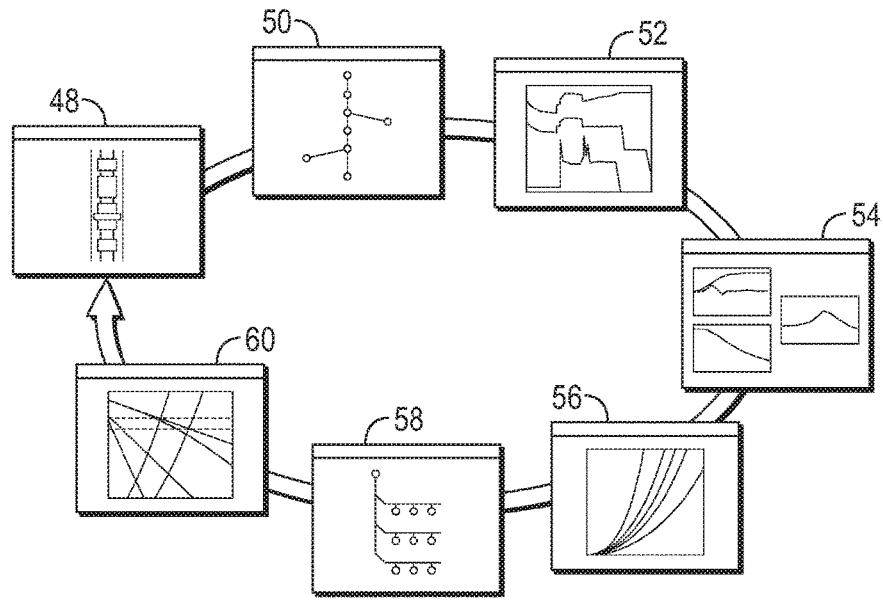
FIG. 2 is a schematic illustration representing an example of workflows in a flow control valve setting system, according to an embodiment of the disclosure.

Referring generally to FIG. 2, a graphical representation is provided to illustrate an example of the model-based architecture and workflows integration. The model-based architecture and workflows integration creates a loop which facilitates optimization of flow control valve settings during operation of a multizone well, e.g. a multilateral well having multiple zones. In this example, a completion schematic or other representation of the actual multilateral well completion 20 is obtained, as indicated by block 48. Based on the architecture of the actual multilateral well completion, a network model is created, as represented by block 50. A wide variety of data, as discussed above, may be collected via sensor system 46 and processed via the network model, as represented by block 52.

In this example, data analysis is then conducted through a deconvolution of the data, as represented by block 54. The data also is analyzed to determine gas and/or water breakthrough, as represented by block 56. An optimization process, e.g. an optimization algorithm, is then applied to the data to determine optimized scenarios for a given objective function, e.g. maximum well production, reduced water cut, gas control, or other objective function, as represented by block 58. The results may then be output, e.g. plotted, in relation to inflow-outflow curves for flow evaluation, as represented by block 60. By way of example, the flow evaluation may be an identification of cross flows between well zones. The results of the flow evaluation are used to validate or adjust the settings of the flow control valves 36, and then the process/loop may be repeated to enable continued optimization for the desired objective function or functions.

Accordingly, the example illustrated in FIG. 2 generally shows the overall workflow for achieving optimum settings of flow control valves 36 in well completion 20. The well completion details are converted into a wellbore network model, and data available from the various sensors of sensor system 46 is analyzed to obtain reservoir properties and fluid related properties. The network model is updated with the latest results received from the sensors for optimization of flow control valve area settings based on the desired, objective function. The results are then provided, e.g. plotted, in relation to inflow-outflow curves for flow evaluation, e.g. cross flow identification, and these updated settings can be implemented at the well site.

Figure 3:
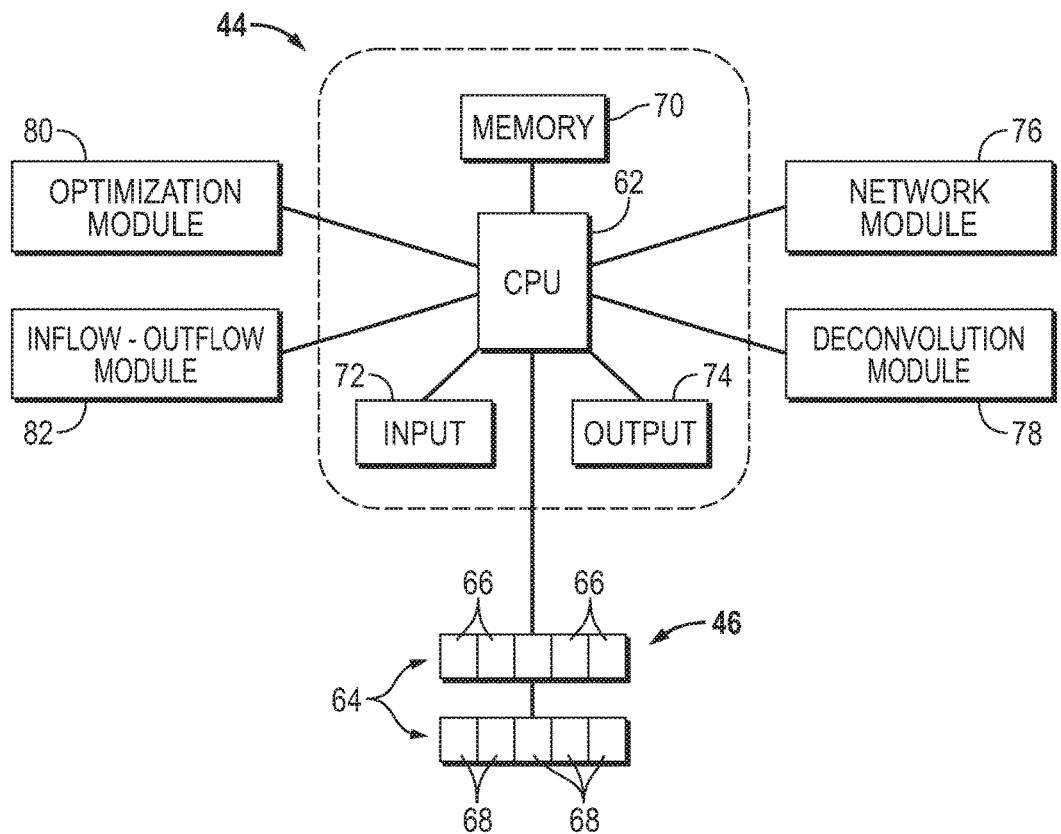
FIG. 3 is a schematic illustration of a processing system which may be used to process data obtained from sensors according to modules of a multizone well flow control valve setting system, according to an embodiment of the disclosure.

Application of the network model and processing of data may be performed on control system 44. By way of example, control system 44 may be a processor-based system, such as a computer system which receives data from the sensors and processes that data via software modules according to parameters provided by the network model. The software module or modules may be embodied in a software program such as Avocet, a production operations software program available from Schlumberger Corporation. In FIG. 3, an example of a processor-based control system 44 is illustrated and may comprise a real time acquisition and control system such as that facilitated by the Avocet software program. In this example, the system 44 may comprise a processor 62 in the form of a central processing unit (CPU). The processor 62 is operatively employed to intake and process data obtained from the sensors 64 of sensor system 46. By way of example, sensors 64 may comprise flow control valve sensors 66 mounted on or near flow control valves 36 to monitor flow control valve settings (e.g. valve flow areas), flow rates through the flow control valves, and/or other flow control valve related parameters (e.g. pressure, temperature, and fluid phase identification parameters). The sensors 64 also may comprise a variety of other sensors 68, e.g. pressure sensors, temperature sensors, flow sensors, and/or other sensors, positioned at various locations in lateral bores 24, 26, 28 and/or other locations along multilateral well 22.

In the example illustrated in FIG. 3, the processor 62 may utilize the real time acquisition and control system, e.g. Avocet, and also may be operatively coupled with a memory 70, an input device 72, and an output device 74. Memory 70 may be used to store many types of data, such as data collected and updated via sensors 64. Input device 72 may comprise a variety of devices, such as a keyboard, mouse, voice recognition unit, touchscreen, other input devices, or combinations of such devices. Output device 74 may comprise a visual and/or audio output device, such as a computer display, monitor, or other display medium having a graphical user interface. Additionally, the processing may be done on a single device or multiple devices locally, at a remote location, or with some local devices and other devices located remotely, e.g. a server/client system.

The processor-based control system 44 is able to work with a variety of modules, e.g. software modules, for implementing the flow control valve setting methodology. For example, the real time acquisition and control system/ processor 62 may be used in cooperation with a network module 76 which comprises a wellbore network model, e.g. Pipesim, representing the various components of multilateral well completion 20. Additionally, the control system 44 may comprise a deconvolution module 78; and the processor 62 may work in cooperation with the deconvolution software module to perform deconvolution of pressure transient responses to continuous zonal rate changes instigated by the actuation of flow control valves 36. The deconvolution module 78 may utilize a standard/multiwell deconvolution algorithm to process the data.

By way of further example, an optimization module 80, e.g. an optimization algorithm, may be used in cooperation with processor 62 for optimizing a given objective function based on data received from sensors 64. An inflow-outflow module 82 also may be used with processor 62 to provide a performance interpretation and advisory technique using nodal analysis of the multilateral well completion 20 and well 22. Modules 76, 78, 80, 82 are examples of various software programs which may be used on control system 44 in carrying out the flow control valve setting procedure described herein. The various raw data, analyses, updated data, modeling results, and/or other types of raw and processed data may be stored in memory 70 and evaluated via the appropriate module.

Figure 4:
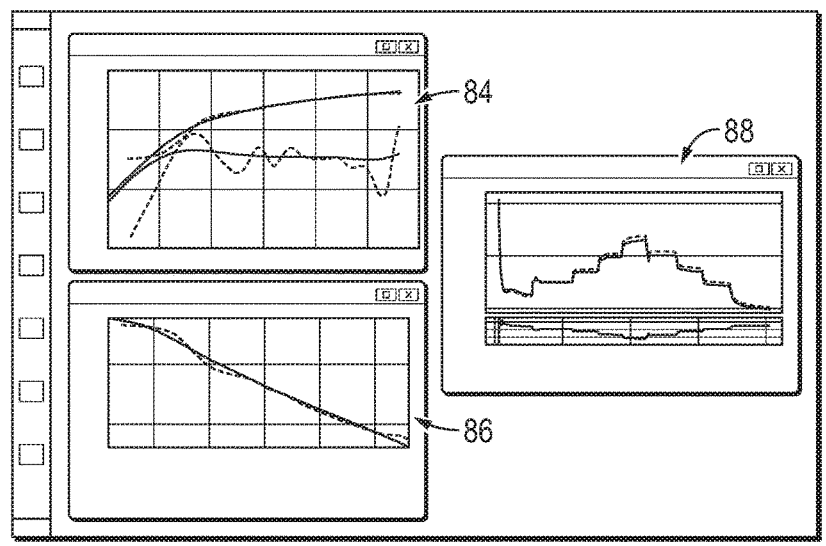
FIG. 4 is a graphical example of results output from the deconvolution of pressure and flow rate data, according to an embodiment of the disclosure.

Referring generally to FIG. 4, a further explanation of deconvolution module 78 is provided. As sensors 64 provide data, e.g. flow rate and pressure data while the flow areas of the flow control valve 66 are manipulated, the multi-rate data is deconvolved via module 78. Deconvolution of data is a process for manipulating data known to those of ordinary skill in the art as using pressure transient analysis. In this example, the data is deconvolved to estimate near well bore parameters, such as skin, permeability, productivity, and/or other desired parameters. This deconvolved data is then input into the well model, e.g. processed according to network well module 76, for accuracy and optimization. FIG. 4 provides examples of various plots related to the deconvolution data which may be output for viewing on output device 74 or another suitable device. The illustrated examples comprise a log-log deconvolution plot 84 of the data, a semi-log plot 86 of the data, and a historical data plot 88. Various other data plots or display formats may be used to show the deconvolved data.

Figure 5:
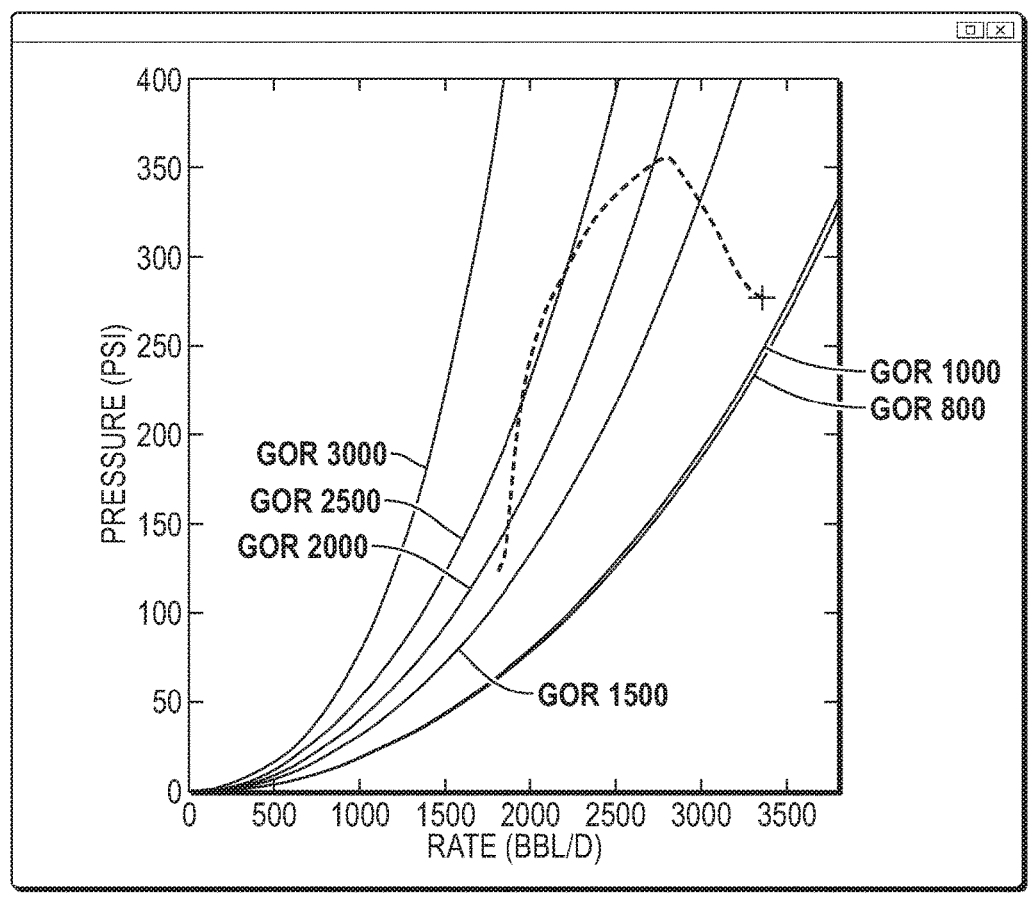
FIG. 5 is a graphical example of results output as cross plots representing gas/water breakthrough in well zones, according to an embodiment of the disclosure.

Referring generally to FIG. 5, a graphical representation of cross plots for gas/water breakthrough is provided for a series of different GORs. The graphical representation plots overall flow rate versus delta pressure for different GORs for each flow control valve 36, and these plots may be produced by the network well module 76. Generally, gas and water production is not desirable in wells producing oil. The flow control valves 36 may be used to control gas/water production when appropriate flow control valve settings are implemented. To facilitate selection of a particular flow control valve setting, the flow control valves 36 producing the undesired fluid phase are initially identified. Because the flow control valves are limited to pressure and flow area control and often do not have the ability to directly detect the presence of gas or water, control system 44 may be used in implementing a workflow which quantitatively identifies the presence of water and/or gas and helps optimize valve settings to reduce these undesired fluid phases.

The flow control valves 36 may be a generic orifice/venturi type valve or other suitable flow control valve for which Delta P versus flow rate (Q) curves may be generated at various gas/water cuts and at different flow control valve settings, i.e. different choke positions. The network model, as represented on the right side of FIG. 1 and as implemented via network software module 76, may be configured to take into account the fluid PVT. Changes in density of the fluid are often reflected in pressure drops and flow rate changes with respect to the corresponding flow control valve 36. Actual flow control valve measurements of flow rates and Delta P (pressure changes) obtained from the multilateral well 22 may be overlaid on a cross plot generated by a flow control valve model.

The plots illustrated in the graph of FIG. 5 show the measured data versus model data and the behavior of the curves. As the points of the measured data align with the model data, a quantitative estimate of the gas/water rate can be made. The estimate can be further used as an input into the well network model for flow control valve setting optimization.

Figure 6:
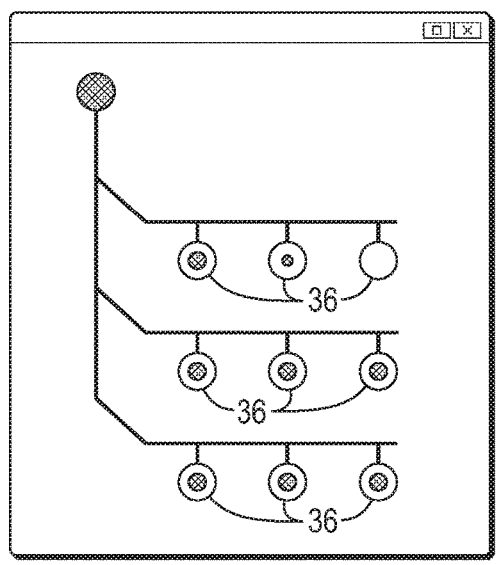
FIG. 6 is a graphical example of a network flow control valve optimizer, according to an embodiment of the disclosure.

Referring generally to FIG. 6, a further explanation of optimization module 80 is provided. Flow control valve optimization has been a challenge due to the dynamic effects of the wellbore hydraulics when one flow control valve setting is changed to a certain setting/position with respect to the other flow control valves. The optimization module 80, however, provides an optimization solver which can be used with the calibrated wellbore network model embodied in network module 76. The optimizer module 80 may utilize a variety of optimization algorithms or models used to adjust flow control valve settings in a manner which optimizes a desired objective function. An example of an optimizer that may be used in optimizer module 80 is the MINLP optimizer available from Schlumberger Corporation and which may be used in cooperation with a network module utilizing nodal analysis software, such as Pipesim, or a numerical simulator software, such as Eclipse, also available from Schlumberger Corporation.

The optimizer module 80 may be designed to generate gradient curves based on the productivity of each well zone 34 at each corresponding flow control valve 36 over various flow control valve settings that are represented in the network model, as illustrated in FIG. 6. In this example, the optimizer module 80 uses constraints of the wellbore, e.g. flow control valve opening areas and inside diameters, multilateral/zonal flow rates, and pressure data, to solve for an objective function, e.g. maximum well production or minimum water/gas flow rates. Based on the optimization processing of data, the optimization module 80 outputs flow control valve settings based on the calibrated model. The flow control valve settings are passed on to the inflow-outflow module 82 for analysis of the inflow-outflow relationship and for validation of the flow control valve settings output by the optimization module 80.

Understanding inflow and outflow curve relationships in a well with multiple flow control valves 36 helps identify cross flow between well zones and this facilitates optimization of well production. Cross flow in multilateral wells is not easily identified or estimated simply by analyzing the pressure data alone as it can have relative dependency across different well zones and settings of the flow control valves, which are dynamic in nature. The workflow methodology described herein utilizes model generated inflow-outflow curves at each well zone 34 associated with a given flow control valve 36. The inflow-outflow module 82 enables the setting up of a nodal analysis node that can be used to aggregate the zonal flow rates.

Figure 7:
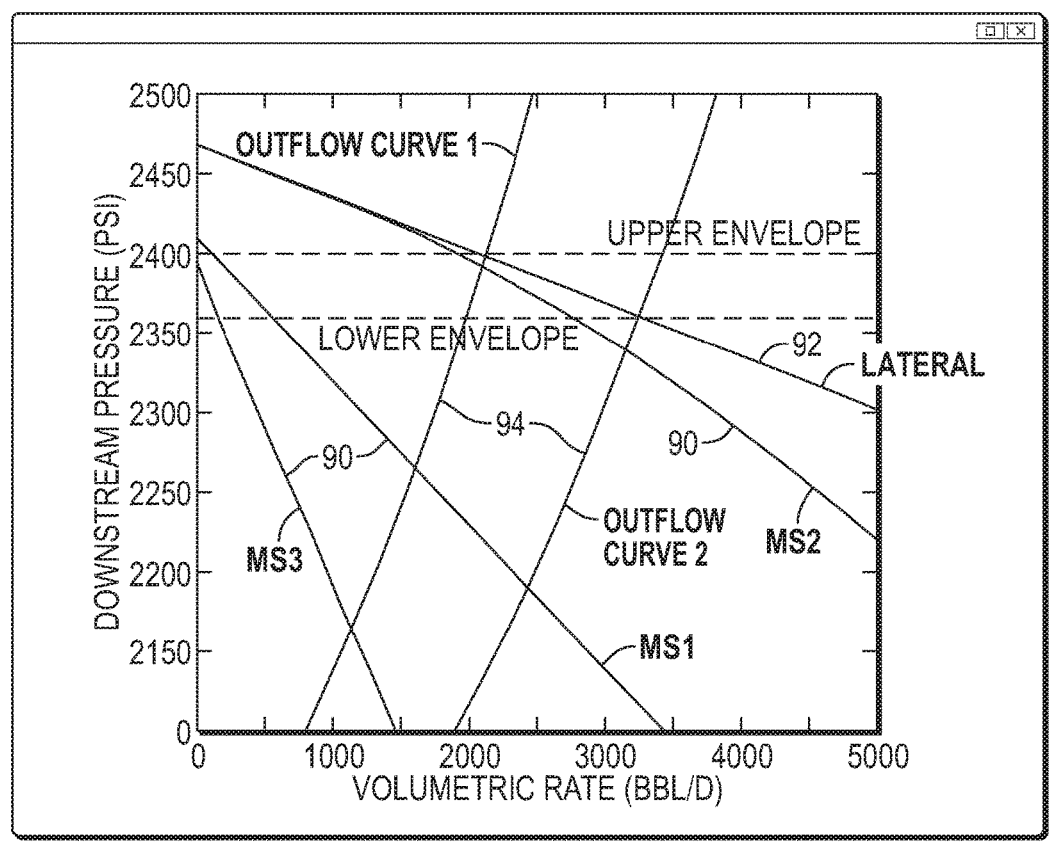
FIG. 7 is a graphical example of inflow-outflow relations in a multizone, multilateral well, according to an embodiment of the disclosure.

Because several flow control valves 36 contribute into the same inflow curve for a multi-segment/multi-zone completion, the present methodology uses inflow-outflow module 82 to construct an aggregate inflow curve for a given lateral bore of lateral bores 24, 26, 28. The lateral bore has multiple zonal contributions. The aggregate inflow curve is achieved by summing the flow rates of individual flow control valves 36 for a given drawdown from the model. The aggregate inflow curve is then intersected with a modeled outflow curve at a selected wellhead pressure to arrive at the nodal analysis operation point, as represented graphically in FIG. 7. The graphical illustration of FIG. 7 plots volumetric flow rate against downstream pressure for three flow control valves, as represented by plot lines 90. The graph also provides an aggregate inflow curve 92 as well as aggregate outflow curves 94 measured at a lateral bore junction. The aggregate outflow curves 94 represent realistic flow data and changes in that data due to choking back flow via, for example, changes in wellhead pressure by adjusting flow control equipment 42. The two outflow curves 94 show the shift resulting from choking back the flow at the surface while the inflow curve 92 is affected when the downhole flow control valves 36 are changed/reset.

The nodal analysis operation point provides a good estimate of flowing tubing pressure upstream of each flow control valve 36 along with corresponding flow rates. If the aggregated nodal pressure point is higher compared to the individual flow control valve inflow pressure, this occurrence represents cross flow between well zones. The inflow-outflow model of module 82 helps rebuild the inflow-outflow curves each time the optimization procedure/program is executed.

The graphical representation of the nodal analysis operation point enables visualization of upstream gauge pressure of an individual flow control valve 36 versus the resulting flow rate in real time. In some embodiments, the flow control valves 36 are supplemented with venturi for measuring a flow rate through an individual valve. Although flow rates are measured directly through venturi calculations in the venturi type of embodiment, the direction of the flow is not identified. However, this approach to forecasting such rates enables both calibrating measurements below the range of venturi sensitivity and identification of cross flows.

Depending on the application, the multizone/multilateral well completion 20 may have many arrangements of flow control valves 36, packers 32, tubing 30, and other components in various lateral bores. Additionally, the control system 44, processor 62, and software modules, e.g. network module 76, deconvolution module 78, optimization module 80, and inflow-outflow module 82, may utilize a variety of models, programs, and/or algorithms to perform the desired data analysis and manipulation to facilitate selection of flow control valve settings to improve a desired objective function.

In FIG. 8, an example of a flow control valve setting procedure in a multilateral well with zonal isolation is provided in flowchart form. Initially, pressure and temperature data, flow control valve position/settings data, and flow rate data may be acquired from downhole sensors 64, as indicated by block 100. Additionally, the structure of the multilateral well completion 20 may be determined by, for example, obtaining a well completion schematic showing the arrangement of flow control valves 36, as indicated by block 102.

Deconvolution is applied to the data indicated in block 100, e.g. applied to the pressure data and the flow rate data, via deconvolution module 78 to obtain reservoir properties, e.g. permeability, skin, and productivity, as indicated by block 104. Additionally, the data from block 100 may be used to identify gas/water breakthrough and to obtain quantitative values related to gas-oil-ratio and water cut, as indicated by block 106, and as discussed above with reference to FIG. 5. The data obtained and/or processed at blocks 100, 102, 104, 106 is provided to network module 76, as indicated by block 108. The network module 76 uses the data to build and/or update the completion network model with the data received on flow control valve settings, tubing, reservoir parameters, and other parameters. The completion network model is calibrated to the last available data regarding, for example, flow rates, pressures, flow control valve settings, e.g. flow control valve areas, and other data, as indicated by block 110.

Once the completion network model is calibrated with the last available data, the model is run on optimization module 80, as indicated by block 112. The optimization module 80 may utilize an optimization algorithm for a desired objective function, e.g. maximum oil flow rate or minimum water/gas production, while maintaining the control variable as a constant flow control valve flow area opening through the flow control valves 36. The results of the optimization are plotted in an inflow-outflow relationship, via inflow-outflow module 82, to obtain commingled flow rates and pressures while looking for indications of cross flow between well zones 34, as indicated by block 114.

If cross flow is determined (see question block 116), the procedure is designed to repeat the processing on optimization module 80 four another selected setting of the flow control valves 36. The results are again plotted for the inflow-outflow relationship to obtain commingled rates and pressures while looking for cross flow. If no cross flow exists at block 116, the optimized flow control valve settings are implemented at the well site on the actual multilateral well completion 20, as indicated by block 118. The process is then repeated by returning to block 100, as indicated in the flowchart of FIG. 8. Thus, the procedure may be run in an ongoing loop to continually improve the desired objective function or functions by continually optimizing the flow control valve settings.

The flow control valve settings may be adjusted repeatedly based on episodic or real time processing of data. The procedure for flow control valve setting can be adapted to many types of multizone/multilateral well completions having an individual lateral bore or various numbers, arrangements, and sizes of lateral bores by providing the appropriate completion system data for the network model. Accordingly, the flow control valve setting procedure may be used in many types of wells, environments, and multilateral completions.

Similarly, the flow control valves, sensor system, control system, processors, software modules, and other individual components of the overall system may be adjusted according to the parameters of a given application. Additionally, many types of objective functions may be optimized. The optimization may comprise maximizing the function, minimizing the function, or balancing the function. Additionally, multiple objective functions may be addressed via the procedure described herein. The procedure/model also may use a variety of workflows. For example, workflows may be designed to perform data analysis and to integrate accurate inputs of reservoir properties, pressures, and fluids to the model. The model may then be updated for running optimization scenarios and validating results for implementation. Once flow control valve settings are implemented, the model is recalibrated and the loop continues.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for controlling flow in a well, comprising:
obtaining data on pressure and flow rates from a plurality of locations proximate flow control valves which are distributed through a multizone completion in at least one lateral bore of a multizone well;
applying deconvolution of the data on pressures and flow rates to obtain reservoir properties with respect to near wellbore parameters along the at least one lateral bore;
identifying flow control valves flowing an undesirable fluid phase to further establish the reservoir properties based on the deconvolution of the data on pressures and flow rates;
using the reservoir properties in a completion network model of the multizone well;
running an optimization algorithm on the completion network model for a given objective function while the flow control valves remain set at a given flow setting;
outputting results from the optimization algorithm of a fluid inflow-outflow relationship to obtain co-mingled flow rates and pressures in the well to determine an occurrence of cross flow between well zones of the multizone well;
providing a graphical interface depicting interdependence of zonal flow rates and pressures based on a determination that flow through a plurality of the flow control valves is co-mingled into a same wellbore flow path; and
based on a determination that cross flow has occurred between well zones of the multizone well, adjusting flow control valve settings within specified constraints to change flow rates and to thus optimize the given objective function.

2. The method as recited in claim 1, further comprising using the data to identify gas breakthrough.

3. The method as recited in claim 1, further comprising using the data to identify water breakthrough.

4. The method as recited in claim 1, further comprising building the completion network based on a layout of the flow control valves, completion tubing, and reservoir parameters.

5. The method as recited in claim 1, wherein applying deconvolution of the data comprises applying deconvolution on flow control valve sensor data to obtain reservoir properties related to permeability, skin, and productivity.

6. The method as recited in claim 1, wherein obtaining data further comprises obtaining data on flow control valve positions and rates.

7. The method as recited in claim 1, wherein the at least one lateral bore comprises a plurality of lateral bores and further wherein obtaining data comprises obtaining data from downhole sensors positioned in the plurality of lateral bores of the multizone well.

8. The method as recited in claim 4, further comprising periodically recalibrating the completion network model based on updated data.

9. The method as recited in claim 1, wherein outputting results comprises plotting the results and displaying the results on a computer display.

10. A method, comprising:
providing a network of flow control valves in a multilateral completion disposed along isolated well zones of lateral bores of a multilateral well;
acquiring data from downhole in the multilateral well;
applying deconvolution of the data to obtain reservoir properties regarding near wellbore parameters;
identifying fluid phases and flow control valves flowing undesirable fluid phases to further establish the reservoir properties based on the deconvolution of the data on pressures and flow rates;
using the reservoir properties in a completion network model;
optimizing the completion network model for a desired objective function;
adjusting settings of the flow control valves in the network of flow control valves to improve the desired objective function, including improving flow of desired fluid phases from the isolated well zones; and
once flow control valve settings are implemented based on optimizing the completion network model, recalibrating the completion network model to continue an optimization loop wherein the settings of the flow control valves in the network of flow control valves are continually adjusted.

11. The method as recited in claim 10, wherein acquiring data comprises acquiring pressure and temperature data from a plurality of sensors located in the multilateral well.

12. The method as recited in claim 11, wherein acquiring data comprises acquiring flow rate data and flow control valve setting data.

13. The method as recited in claim 10, wherein acquiring data comprises acquiring data on an episodic basis.

14. The method as recited in claim 10, wherein acquiring data comprises acquiring data in real time.

15. The method as recited in claim 10, further comprising processing the data to identify gas or water breakthrough.

16. The method as recited in claim 10, wherein optimizing the completion network model comprises running an optimization algorithm on a processor system.

17. The method as recited in claim 10, further comprising plotting an inflow-outflow relationship based on the optimization of the completion network model to obtain commingled flow rates and pressures and to determine cross flow of fluids between zones of the multilateral well.

18. The method as recited in claim 10, wherein optimizing the completion network model comprises optimizing for the desired objective function of a maximum oil flow rate from the multilateral well.

* * * * *